United States Patent [19]

Mueller

[11] 4,113,610
[45] Sep. 12, 1978

[54] AGRICULTURAL SORTING AND PACKING APPARATUS

[76] Inventor: Loren H. Mueller, Rte. 7, Box 62, Yakima, Wash. 98903

[21] Appl. No.: 736,560

[22] Filed: Oct. 28, 1976

[51] Int. Cl.² .............................................. B07C 7/00
[52] U.S. Cl. ..................................... 209/705; 56/15.6; 56/DIG. 9
[58] Field of Search ............... 209/125, 84; 56/328 R, 56/DIG. 9, DIG. 14, 14.1, 15.6, 16.5; 53/138 R, 59 W

[56] References Cited

U.S. PATENT DOCUMENTS

| 2,379,198 | 6/1945 | Templeton | 209/125 |
| 2,782,943 | 2/1957 | Jones et al. | 56/328 R X |
| 2,815,250 | 12/1957 | Thornton-Trump | 56/328 R |
| 3,021,658 | 2/1962 | Mitchell | 56/15.6 X |
| 3,475,889 | 11/1969 | Overstreet et al. | 56/328 R |
| 3,620,434 | 11/1971 | Marquis et al. | 53/138 R X |
| 3,720,039 | 3/1973 | Warkentin | 53/59 W |

*Primary Examiner*—Robert B. Reeves
*Assistant Examiner*—John P. Shannon
*Attorney, Agent, or Firm*—Nicolaas DeVogel

[57] ABSTRACT

A harvesting combine apparatus comprising a compactly structured unit to be installed on and about a tractor and designed for easy maneuvering mobility among trees in orchards. The unit employs sequentially a slanted input conveyor in line with a horizontally positioned sorting conveyor and output guide ways for disposing agricultural products into containers, to be weighted and closed for shipping. The unit carries motors to drive the conveyors, which are powered by an external electrical or by attached mechanical to electrical current converted power source.

6 Claims, 5 Drawing Figures

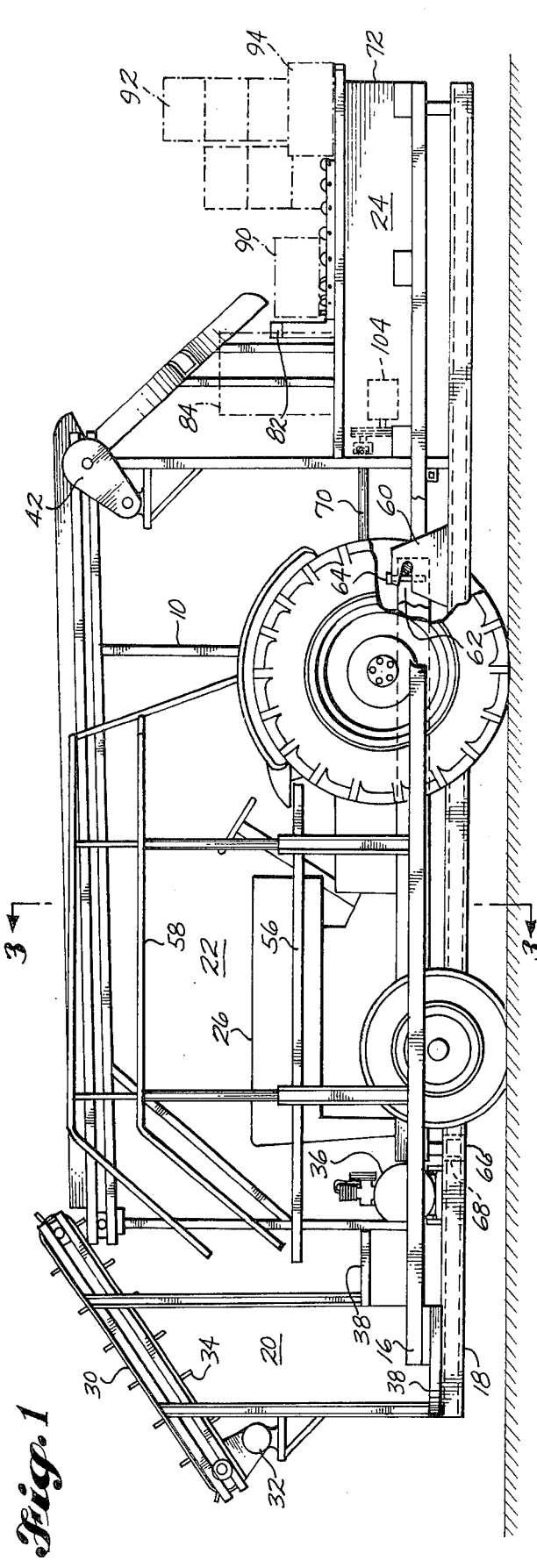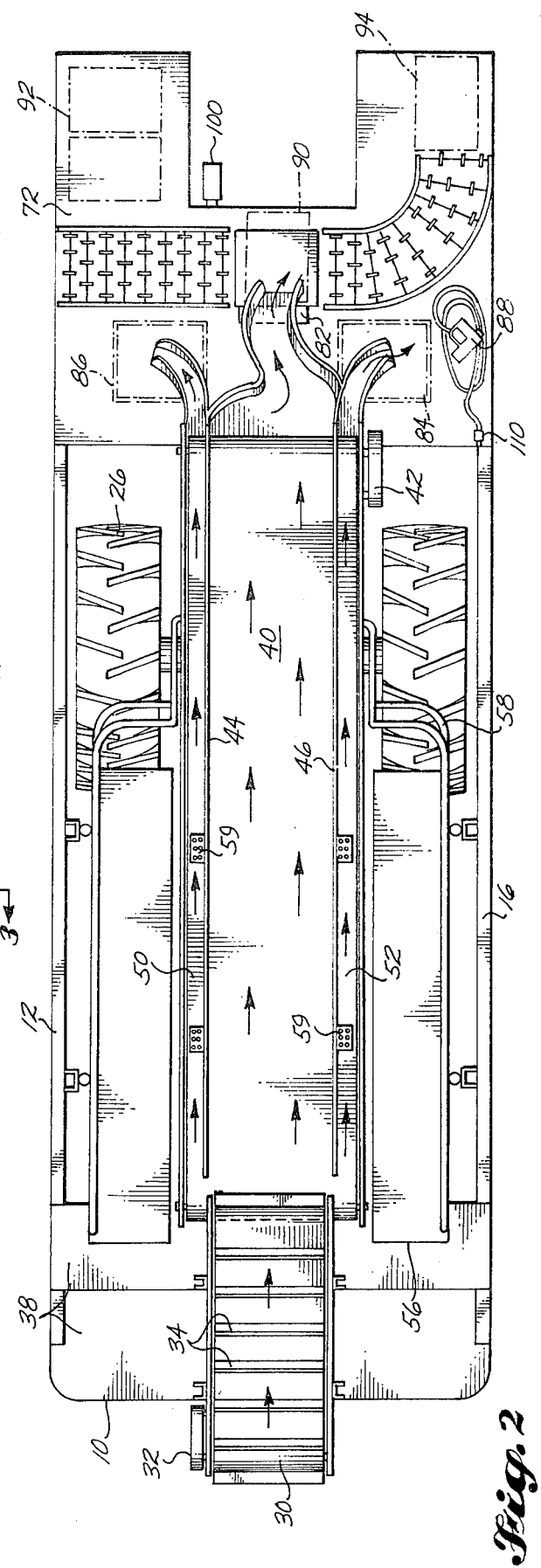

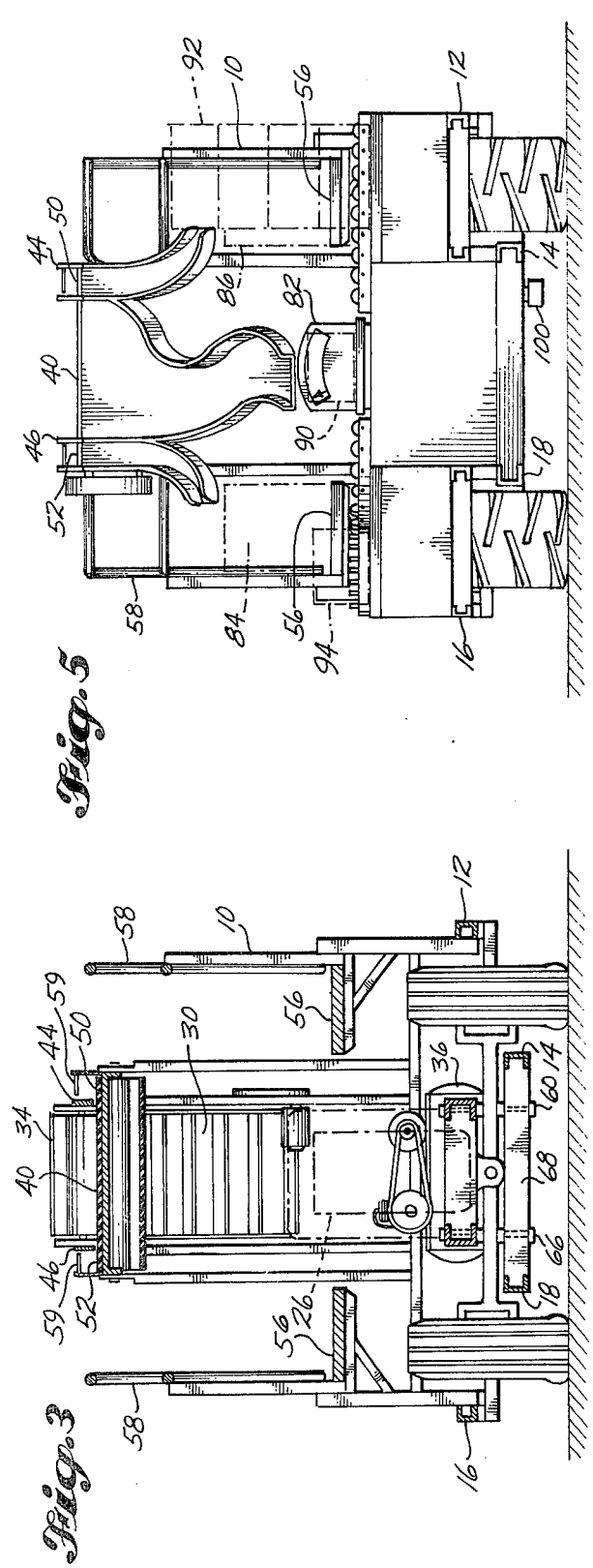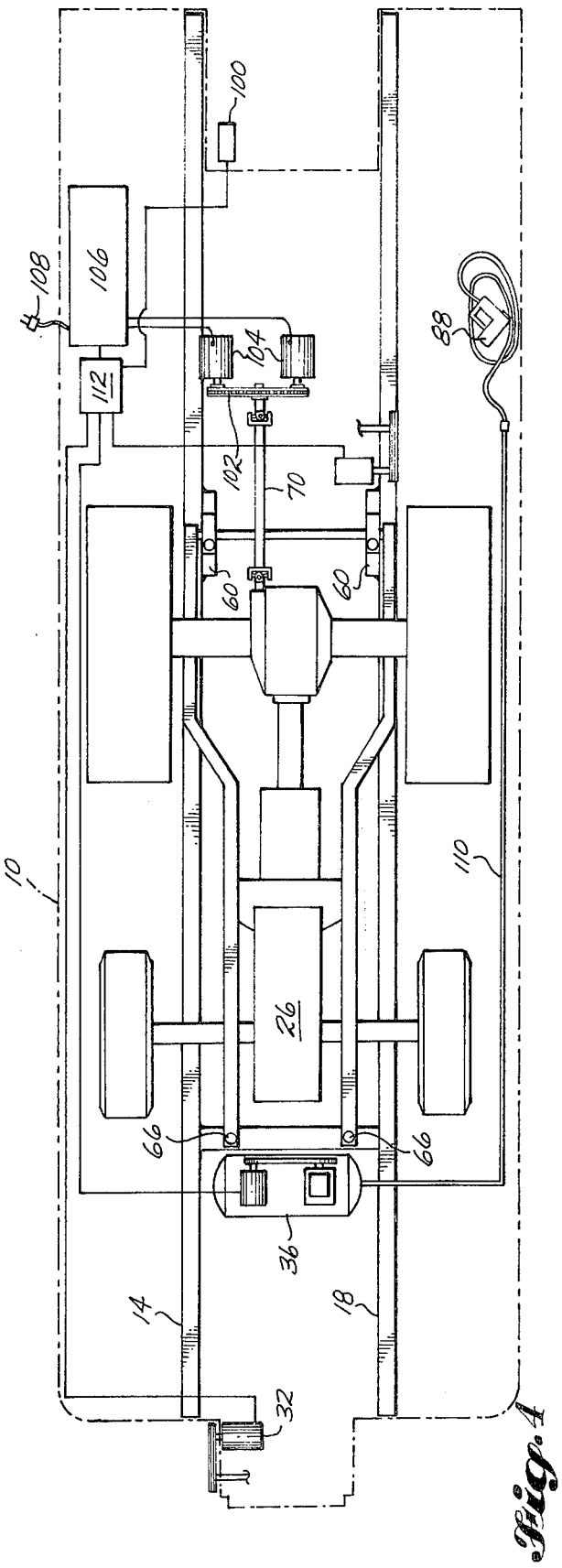

AGRICULTURAL SORTING AND PACKING APPARATUS

BACKGROUND OF THE INVENTION (a) Field of the Invention

The present invention relates to a harvesting apparatus for agricultural products, such as; cherries, plums, apples, pears, vegetables, etc. More particularly, it comprises a machine that is adapted to; distribute the produce in equal portions and thereafter spread the produce for sorting, sizing, weighing, packing and securing the boxes at the orchard or field for direct transport to the marketing-business.

(b) Description of the Prior Art

In the prior art there have been noticed machines which are capable of performing various functions in the field, but those machines are used for agricultural products which are tougher and which do not need sizing or sorting, weighing and box-packing. Such machines are normally used in the harvesting of potatoes or the like and are generally adapted with a digging feature and a product soil removing feature. Some machines have the capability of an on-the-spot bagging station. As of interest are the U.S. Pat. No. 1,343,586 and No. 2,338,337. Of particular interest and having a closer relationship with the present invention are apparatus which sizes and sorts agricultural products of a more delicate structure, as disclosed in the U.S. Pat. No. 1,906,331 and No. 2,618,387. Of course it should be realized that those apparatus are large conveyor set-ups used for very large quantities of produce and are normally located permanently in a warehouse. In comparison with the present invention such arrangements have a large amount of waste, since the delicate produce is handled more than at a small ranch. For instance, the picked produce has to be collected and stacked and then driven to the warehouse where the produce is temporarily dumped in a bin until it can be processed on the large conveyor system. As will be described hereinafter, applicants invention avoids the many trips from the orchard or field to the warehouse and reduces the produce handling several times.

The most similar looking apparatus found in the patent search is illustrated in U.S. Pat. No. 2,379,198 by Templeton. The main differences are that the apparatus is used for tougher produce such as potatoes and would not be useful for all the various steps of processing that are accomplished by the present invention. Furthermore, the apparatus is being pulled and would be awkward in handling in an orchard. As a matter of fact, Templeton discusses a certain way of harvesting by alternately taking rows at opposite ends of the field. Also in the plan view the operation of the apparatus is different and the center belt is used for dirt clay and rocks, while the side belts are the ones to carry the picked-out potatoes.

There are several other differences which will become more apparent hereafter.

SUMMARY OF THE INVENTION

The argicultural sorting and packing apparatus comprises a metal frame structure which carries two belts with motors, a scale and an air-compressor with automatic stapling tool. The arrangement has two walkways for sorting personnel and a control station at the end where the supervisor is in an all overseeing position and takes care of the driving of the apparatus, the speed of the belts and also handles the empty boxes, liners, weighing, securing of the lid to the box and the stacking on the ground of the packed boxes on pallets, ready for strapping and pick-up by freightcar to the market or wholesaler. The apparatus can be used stationary or when in combination with a tractor, it can be moved in the field or orchard.

One of the particular advantages of the apparatus is its compact design and mobil use, rather then being pulled behind a tractor and thus is very easily steered between trees and rows of bushes or the like. Also the structure or framing of the apparatus is light and its components are arranged in such a well-organized fashion that the complete process of spreading, sorting, sizing, weighing and packing of the delicate produce takes place within 20 feet.

The power operation of the apparatus is controlled by one person, who is in an all overseeing supervisory position and who drives the apparatus, controls the collecting and sorting belts, weighs, packs, fastens the lids of the shipping boxes and stacks the same for transportation.

The produce is picked by field pickers in buckets and someone will dump the produce on the collecting or input belt and from the dumping state to the packing, the produce will receive the least amount of handling so that the bruise damage is minimum, assuring good sales quality.

One other important feature of the present invention is the temporary utilization of the tractor which after the harvest can be used for other purposes. In the stationary mode of operation, the apparatus is preferably located near the cold storage facilities in which case the tractor is normally not attached, and the power for the apparatus can be obtained from the conventional 110 volt 60 cycle current of the house or ranch.

In summary, the agricultural sorting and packing apparatus will save substantial harvesting time, handles the produce faster and more efficiently, and the complete operation is financially economic so that a higher profit for the grower is realized.

Accordingly, it is an object of the present invention to provide for an agricultural sorting and packing apparatus which is designed to be carried by a standard tractor for mobil use and receives its initial power therefrom and while in a stationary position can operate on conventional house current.

It is another object of the present invention to provide for an agricultural sorting and packing apparatus which utilizes an inclined surveyor means for proportioning the produce in equal parts at the input and a thereafter following sorting conveyor means at a different predetermined speed for establishing proper spreading of the produce to enable smooth continued manual sizing and sorting. It is another and most important object of the present invention to provide for an agricultural sorting and packing apparatus which saves harvesting time, reduces product handling and bruising, completes packing for product shipping and is financially economic.

These and other objects, advantages and features of the invention will appear more fully from the following detailed description when the same is read in connection with the accompanying drawings. It is to be expressly understood, however, that the drawings are not intended as a definition of the invention but are for the purpose of illustration only.

DESCRIPTION OF THE DRAWINGS

FIG. 1 is a side view of the agricultural sorting and packing apparatus carried by a tractor for mobility.

FIG. 2 is a plan view of the apparatus with arrows indicating the flow of the produce from input via the sorting to the weighing and packing station.

FIG. 3 is a cross-section taken along lines 3—3 of FIG. 1 for illustrating in particular the frame construction, walk ways, belts and compressor arrangement.

FIG. 4 is a schematic plan view of the apparatus for locating the power take-off and the arrangement of the various motors and the pneumatically driven packing/stapling tool.

FIG. 5 is a rear view of the apparatus.

OPERATION OF THE INVENTION

The present invention is illustrated in one preferred embodiment only and in the herein following description, like reference numerals denote corresponding parts throughout the several views.

Referring to FIGS. 1—3 there is illustrated the agricultural sorting and packing apparatus 10. The apparatus comprises a metal frame structure having a base formed by four channel members 12, 14, 16 and 18.

On the base members are mounted three major supporting assemblies;

I. the input conveyor support assembly 20,
II. the sorting conveyor support assembly 22, and
III. the control station assembly 24.

The assembly 20 carries an input or collector belt 30 and driving motor 32. So that the agricultural sorting and packing apparatus is compact in design and length, for the advantage of easy turning in the confined orchard and field growing spaces, the input belt 30 is arranged in a slanted position and for that reason has protruding members 34, for elevating the produce placed on the belt 30. Another important purpose of the equally spaced members 34 on the belt 30 is the dividing of the volume of produce which is dumped from the picking-bucket onto the belt 30 and accordingly separated by the member 34 into equal heaps which enhances the equal flow and spreading toward the sorting assembly 22. The input assembly 20 also contains a motor-compressor 36 and steps 38 which are mounted on the base channel members 12–18.

The input conveyor support assembly is mechanically mounted to the base-members in such a manner that easy removal or mounting can be obtained. Thus, when the input assembly 20 is removed from the base channel members 12–18, then the front of the apparatus 10 forms an open entry and the tractor 26 can be driven in or out. The input assembly 20 is therefor connected with conventional fasteners so that removal or mounting is accomplished within an hour. The tractor 26 can thus be utilized for other purposes and becomes more economical to the owner.

The sorting conveyor support assembly 22 comprises the sorting belt 40 and its driving motor 42. The belt 40 is wider than the input belt 30 and is arranged with two separating members 44 and 46 which divides the belt 40 area into three longitudinal areas. The center area 48 will carry the produce which now evenly drops, during operation of belt 30 and 40, onto the much wider belt 40, the last one running slower which provides for an even spread of the produce. This might sound strange at first; however, since the produce moves from a smaller area onto a larger area and also the fact that when the produce is at the apex position of the input belt 30, the produce rolls off in layers from its heaped condition and spreads itself neatly on the roomier sorting belt 40. Thus, it is very important that each belt runs at a different speed and by trial and error, the inventor solved it by using equal speed motors of each 45 rpm, but using different gears. For example, the input motor 42 has an axle-mounted first gear with sixteen teeth driving via a chain a belt gear with forty-five teeth and the sorting motor 42 has an axle mounted first gear with thirteen teeth driving via a chain a belt gear with forty-five teeth.

Without the proper speed ratio for the belts, the spreading becomes uneven and the sorting of the produce or fruit by the sorters becomes harder and less efficient. In addition there are two sizing templates 59 which are installed at each side-belt area's 50 and 52.

During operation of the apparatus which, for example, would process cherries, the sorters, normally located at each side of the sorting belt 40, will pick the culls and the brining cherries and dispose them on the side-belt area's 50 and 52, respectively or vice versa.

For the sorters convenience, there are provided at each side of the sorting belt 40, removable standing platforms 56 with removable safety banisters 58, as illustrated. Underneath of the sorting belt 40 are mounted, on the base members 14 and 18, which are the two lower and inside channel base members (see FIG. 3), two tractor holding means. One holding means may be called the self aligning tractor back-in connector 60 and comprises a vertically positioned metal plate with a "V" shaped slot 62 and a drop-pin 64, so that the tractor 26 when backed-in easily aligns with its rear bumper rail into the slots 62 and is hooked on by dropping the pin 64 into the connector 60.

The front part of the tractor is connected by conventional bolt-washers-nut arrangements 66. This is accomplished by providing one or more holes in the tractor transverse frame or channel located under the tractor engine. Then the holes are aligned with openings in a transverse member or channel 68 mounted by removable fasteners to the base members 14 and 18. It will thus be understood by any person skilled in the art that the tractor 26 and the apparatus 10 thus connected will form one mobile unit. In order to provide power for the apparatus 10 a mechanical power take-off from the tractor 26 is utilized by means of a double ended universal equipped connecting bar 70. (See FIG. 4).

The control station assembly 24 is in-particular illustrated in the FIGS. 1, 2, and 5 and comprises an elevated "U" shaped platform or table 72 which supports three guideways 74, 72 and 78. The table 76 carries conventional roller assemblies, a scale 82, a cull-bin 84 and a brine-bin 86 as well as a pneumatic stapler 88.

During operation of the agricultural sorting and packing apparatus 10, the empty fruit boxes and lids 90 are telescopingly stacked at area 92 on the table 72 and a box is manually moved onto the rollers and placed on the scale 82. The operator arranges the lining papers and the fruit, coming from the guideway 76, in the box until the correct weight is reached; if needed he can stop the moving of the belts immediately by a control switch 100, then he folds the lining paper, fits the lid and staples it closed with the automatic power stapler 88. He moves the finished box to area 94 and starts the next one and so on until a certain number of filled boxes is stacked up, which are then removed to the ground preferably on pallets ready for strapping and pick-up by other transportation towards the business-marketing environment. As will be noticed, the present invention teaches a remarkable smooth operation which takes place right under trees on the orchard or at the field and none of the produce is shipped toward special sortings or ranch processing places. In normal operations four sorting persons are used on the platform and one operator who controls speed and processing.

The power operation of the present invention is illustrated in FIG. 4. As shown, the connecting bar 70 drives a gear 102 which is coupled to two 115 volt alternators 104 which are electrically connected to a terminal box 106. The terminal box 106 and the alternators 104 are mounted underneath the table 72. The terminal box 106 is provided with the usual fuses, etc., and has a special input-outlet 108 for stationary operation of the apparatus 10 when the power take-off from the tractor 26 is not used. From the terminal box 106 is a direct connection to the air-compressor 36. An airhose or pipe 110, completes the connection to the stapler 88. The belt motors are electrically connected to the terminal box 106 via a relays control box 112 which has an electrical connection to the belt-control switch 100 at the control station 24. Most preferable the belt control switch is a mechanically operated foot switch thus enabling the operator or supervisor to keep his hands moving in the weighing, packing and stacking operation.

FIG. 5 shows a typical arrangement of the control station which affirms the above and needs no further explanation except for the fact that it should be noted that the operator walks in the open "U" area and does not drive along like the sorters. This provides very easy moveability to the operator who thus can be anywhere around the apparatus, if need exists.

While the preferred embodiment of the present invention has been illustrated and explained herein, it will be understood that various changes might be made in the combination, construction and arrangement of the parts by those skilled in the art, however, without departing from the scope of this invention as claimed hereinafter.

Now, therefor, I claim:

1. An agricultural sorting and packing apparatus comprising in combination:
   (a) a base frame construction,
   (b) an input conveyor assembly mounted on said frame construction carrying a slanted upward moving endless belt for receiving associated harvested produce,
   (c) a sorting conveyor assembly mounted on said frame construction sequentially next to said input conveyor assembly for receiving said produce to be sorted, said sorting conveyor carrying a substantially horizontally positioned moving endless belt,
   (d) a control station assembly mounted on said frame construction, sequentially next to said sorting conveyor, comprising guideways and a platform, for guiding said sorted produce from said sorting conveyor belt via said guideways to containers positioned on said platform for packing and shipping,
   (e) said input conveyor assembly, said sorting conveyor assembly and said control station assembly mounted in compact, successive arrangement whereby said sorting conveyor assembly is located at an elevated position so that an associated tractor or the like is positioned and fastened by connecting means for fastening said tractor underneath said sorting conveyor assembly to said base frame construction, and wherein said input conveyor assembly can be manually removed from said frame construction whereby an entry opening is formed in said agricultural sorting and packing apparatus front portion for receiving said tractor so that part of said frame construction remains underneath said tractor between said tractor's wheels for mounting of said tractor at rear and front to said frame construction, and
   (f) said connection means for said tractor to said frame construction comprises (1) back-in-rear tractor connector means mounted to said frame construction, and (2) front fastening means provided between said tractor front portion and said base frame construction for mounting said tractor to said frame construction so that said tractor, when mounted to said frame construction, forms a one mobile unit.

2. An agricultural sorting and packing apparatus, as claimed in claim 1 wherein said input conveyor belt and said sorting conveyor belt are driven by motor means for moving said belts and wherein said motor means are powered by electrical output of an alternator means electrically connected therewith and wherein a coupling member is provided between said tractor motor and said alternator means for actuating said alternating means.

3. A mobile agricultural sorting and packing apparatus comprising in combination:
   (a) a frame construction to be carried by an associated tractor or the like, said construction extending and mounted forward and aftward of said tractor, thereby forming in combination a one mobile unit,
   (b) said forward extending frame construction provided with an operable mounted upward slanted input conveyor belt assembly,
   (c) said aftward extending frame construction provided with downward slanted guideways and a platform together forming a control packing station,
   (d) a sorting conveyor belt assembly mounted to said frame construction above said tractor and connected in-between said forward and aftward extending frame construction,
   (e) said input conveyor belt assembly, said sorting conveyor belt assembly and said guideway means forming a continuous upward, horizontal and downward path, disposed forward, above and aft of said tractor respectively, for moving associated harvested produce from said input belt assembly toward said packing station,
   (f) motor means for moving said belts connected to said input belt and said sorting belt,
   (g) said motor means electrically connected to and powered by electrical output from an alternator,
   (h) said alternator mechanically coupled to said tractor motor and actuated thereby, and
   (i) said control packing station platform provided with automatic weighing means located underneath said guideways for accomplishing packing and weighing of said produce on said weighing means in associated containers or the like, and wherein said platform is provided with automatic stapling means connected to and indirectly powered by said alternator means for closing said containers for shipping.

4. A mobile agricultural sorting and packing apparatus, as claimed in claim 3, wherein said sorting belt is wider than said input belt and positioned slightly underneath said input belt upper portion so that said produce drops from said input belt onto said wider sorting belt in regular even flow for enhancing spreading into one layer of produce and wherein said input belt is driven slightly faster by said motor means than said sorting belt for enhancing a continuous, even spreading of produce on said sorting belt to accomplish faster sorting.

5. An agricultural sorting and packing apparatus, as claimed in claim 4, wherein said sorting belt is provided with longitudinally disposed dividing members for separating said sorting belt into a plurality of moving areas for disposition of said produce during sorting into specific groups and wherein said areas are lined up with said guideways for disposing each of said groups into predetermined containers for further handling.

6. An agricultural sorting and packing apparatus, as claimed in claim 5, wherein a switch is provided at said control packing station for operating control of said motor means so that movement of said belts can be stopped and started in order to regulate produce flow into said control packing station.

* * * * *